United States Patent [19]
Williams

[11] Patent Number: 5,996,077
[45] Date of Patent: Nov. 30, 1999

[54] ACCESS CONTROL SYSTEM AND METHOD USING HIERARCHICAL ARRANGEMENT OF SECURITY DEVICES

[75] Inventor: Charles S. Williams, Cupertino, Calif.

[73] Assignee: Cylink Corporation, Sunnyvale, Calif.

[21] Appl. No.: 08/876,362

[22] Filed: Jun. 16, 1997

[51] Int. Cl.$^6$ .................................................. H04L 9/00
[52] U.S. Cl. ............................................................ 713/201
[58] Field of Search ................................. 713/200, 201, 713/202; 709/229; 380/23, 25

[56] References Cited

U.S. PATENT DOCUMENTS

| | | | |
|---|---|---|---|
| 5,235,642 | 8/1993 | Wobber et al. | 380/25 |
| 5,481,720 | 1/1996 | Loucks et al. | 395/700 |
| 5,577,209 | 11/1996 | Boyle et al. | 395/200.06 |
| 5,623,601 | 4/1997 | Vu | 395/187.01 |
| 5,649,185 | 7/1997 | Antognini et al. | 395/609 |
| 5,828,893 | 10/1998 | Wied et al. | 395/800 |
| 5,898,830 | 4/1999 | Wesinger, Jr. et al. | 713/201 |

OTHER PUBLICATIONS

Grennan, "Firewalling and Proxy Server Howto", Linux Howto document vol. 4; markg@netplus.net, Nov. 1996.

B. Clifford Neuman and Theordore Ts'o, "Kerberos: An Authentication Service for Computer Networks," IEEE Communications Magazine, Sept. 1994, pp. 33–38.

Nayeem Islam, Rangachari Anand, Trent Jaeger, and Josyula R. Rao, "A Flexible Security System for Using Internet Content," IEEE Software, Sep./Oct. 1997, pp. 52–59.

*Primary Examiner*—Robert W. Beausoliel, Jr.
*Assistant Examiner*—Scott T. Baderman
*Attorney, Agent, or Firm*—David Newman Chartered

[57] ABSTRACT

A hierarchical arrangement of security devices for securing a protected network through a plurality of security devices having security rules of descending strictness. The system includes a first security device between two networks, and a second security device coupled to the first security device. A frame is processed by the first security device if the first security device's security policy allows processing. If there is insufficient information for the first security device, the first security device passes the frame to the second security device for processing. Additional security devices may be added in a hierarchical chain as necessary or desired. Passing-off may also be prevented to provide multi-level security within a protected network.

30 Claims, 7 Drawing Sheets

ACCESS CONTROL SYSTEM AND METHOD USING HIERARCHICAL ARRANGEMENT OF SECURITY DEVICES

BACKGROUND OF THE INVENTION

This invention relates to network security and more particularly to a system and method for hierarchically combining two or more security devices for providing an integrated set of security services derived from the combination of devices.

DESCRIPTION OF THE RELEVANT ART

Awareness of the value of information together with advances in modern state-of-the-art telecommunications technologies including personal computers, local area networks, distributed data bases, packet radio, satellite teleconferencing, electronic mail, and electronic funds transfer, has stimulated an increased awareness of the vulnerability of communications links to interception and of the susceptibility of databases to exploitation and tampering. This same telecommunications revolution has resulted in the widespread availability of technology for implementing techniques which can provide authenticated communications that also can be made secure against eavesdropping, tampering or unauthorized access.

In response to this revolution and awareness, communicators increasingly have become aware of communications privacy and security. A technical solution for providing security against both eavesdropping and the injection of illegitimate messages includes cryptography. A technical solution for providing security against unauthorized use of networks or computers is strong authentication through digital signatures. Together, cryptography and digital signatures provide the next generation of products for protecting networks.

Most networks are protected by firewalls. A "firewall" is a set of rules implemented to prevent unauthorized users from accessing a protected network. For example, many corporate networks have firewalls between their networks and a public network, typically the Internet. These firewalls are rule-based security devices that selectively allow or disallow packets from entering or leaving the corporate network. FIG. 1 illustrates the role of a firewall 103, operating according to a set of rules 104, between a protected network 101 and a public network 102. These firewalls isolate the protected network from the unprotected or public network.

Firewalls analyze each packet flowing between the protected and unprotected network and, through a set of security rules, determine whether or not the packet is allowed to pass between the two networks. Most conventional firewalls are based on one or more mechanisms for protecting the network. These include address filtering, application proxy, and network address translation.

There are many types of firewalls and unfortunately each type has its unique conventions. In all cases the security administrator of a protected network must configure the firewall to allow approved traffic to flow between the protected and public networks while at the same time blocking unapproved traffic. Generally the configuration and maintenance of the firewall is a tedious process. Also each firewall vendor has its own set of conventions for configuring the firewall. Therefore, a configuration for one firewall seldom maps to a configuration for a different firewall. Many firewall users have made significant investments in the configuration of their firewalls, and changing from one firewall to another can be a long and expensive process.

Next generation products using cryptography and digital signatures provide stronger network security. But these products must co-exist with the current firewall products. It is expensive and disruptive to require the removal of an existing firewall and the new installation of security devices based on cryptography. Rather, the cryptographic product should support features and functions that allow it to co-exist with the current firewalls. Such a security device will co-exist with multiple devices and provide enhanced security when possible, otherwise falling back to the existing security solutions (e.g., firewalls).

New enhanced firewalls supporting advanced security features are becoming available. Vendors are announcing firewalls that implement strong authentication, data privacy, and data integrity. Unlike the earlier firewalls, this new generation of firewalls relies on a "far end" device (e.g., firewall, router, or host) that has the ability to support authentication, privacy and integrity.

The present invention presents a novel approach to the combination of cryptography with network access security devices such as firewalls. With the present invention, it is now technically possible to augment existing network security devices (e.g., firewalls) with next-generation security devices without having to reconfigure the existing devices. This next generation of security devices employs certificate-based authentication for identity and access control, and encryption for privacy and frame-to-frame integrity. The present invention solves the problem of how to support the legacy firewall rules while gradually upgrading some of the network to the enhanced security features.

SUMMARY OF THE INVENTION

A general object of the invention is a system and method for combining the capability of two or more security devices to secure a protected network.

Another object of the invention is the incorporation of cryptographic techniques into rule-based security devices for enhanced security and privacy.

An additional object of the invention is a system and method for transitioning from a traditional firewall system to a certificate and key exchange level of security.

A further object of the invention is a system and method having certificate and key exchange security capabilities, capable of being integrated with an existing firewall protection system to create an access control system having a hierarchical entry capability.

According to the present invention, as embodied and broadly described herein, a system and method for combining the capability of a plurality of security devices to provide hierarchical access to a protected network is provided.

The system comprises a first security device and a second security device, coupled on a communications link between a protected network and a public network. The first security device is programmed to process a frame using a first set of access requirements. The second security device, coupled to the first security device, is programmed to process the frame using a second set of access requirements. Typically, the first set of access requirements imposes a more stringent security access requirement than does the second set of access requirements.

A frame on the communications link is received by the first security device. If the first security device has sufficient information to process the frame, then the first security device processes the frame. If the first security device does not have sufficient information to process the frame, then the first security device passes the frame to the second security device. If the second security device has sufficient information to process the frame, then the second security device processes the frame. Additional security devices may be added in a hierarchical chain of descending access requirements as necessary or desired.

The present invention also includes a method for interconnecting a plurality of security units in a distributed network to provide levels of security between a protected network and a public network. The method comprises the steps of receiving, by a first security device, a frame and attempting to build a security connection on the basis of the frame, or otherwise processing the frame. If the first security device cannot build a security connection or otherwise process the frame, then the first security unit passes the frame to a second security device. The second security device determines whether there is sufficient information in the frame for processing. If insufficient information is present, then the method may further comprise the steps of passing the frame to an $n^{th}$ security device. The steps of determining and passing may be repeated for as many security devices as are included in the plurality of security devices.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
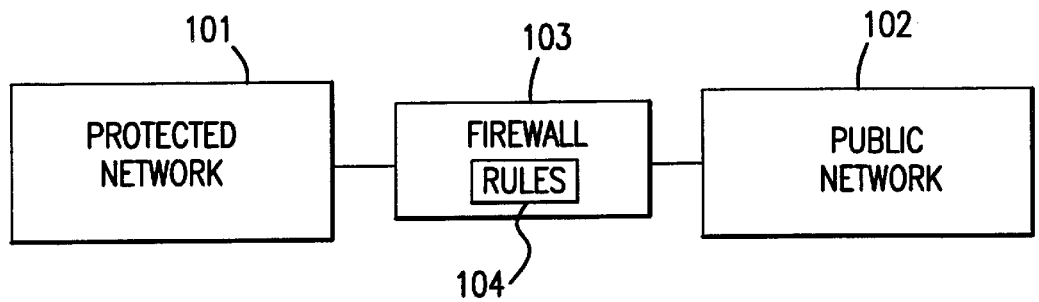
FIG. 1 illustrates the role of a firewall in the prior art.

Reference now is made in detail to the present preferred embodiments of the invention, examples of which are illustrated in the accompanying drawings, wherein like reference numerals indicate like elements throughout the several views.

The present invention addresses the problem of how to upgrade existing firewalls to next generation firewalls. Any transitional solution must support the existing or legacy firewall rules while gradually upgrading some of the network to the enhanced security features. In reaching a solution, there are at least four options.

First, the current firewall vendor can be retained with the hope that the vendor will support legacy functions in the next generation firewalls. If this is done correctly, the next generation firewall will support the legacy security policy.

A second alternative is to change firewall vendors. This requires a new configuration to support the legacy security policy and is therefore an expensive alternative.

A third choice is to use the network to segregate the traffic using the legacy security policy from the traffic using the enhanced security features. This can require a redesign of the network, which is a very expensive process.

Finally, a fourth solution is to use a next generation firewall that is designed to co-exist with the legacy firewall. Such a unit has the intelligence to automatically segregate the legacy traffic from the traffic using enhanced security features without requiring changes to the network. This last option provides the customer with the maximum flexibility in the selection and deployment of firewall solutions. The present invention represents an embodiment of this fourth solution and is the preferred option if it can be implemented with little additional overhead or cost.

The system of the present invention comprises a plurality of security devices in a hierarchical arrangement for securing a communications channel between a protected network and a public network, or between two protected networks. The plurality of security devices includes a first security device and a second security device.

The first security device is coupled between the protected network and the public network on the communications channel. The second security device is coupled to the first security device. The first security device may be embodied as an encryption processor. The second security device may be embodied as a firewall.

The first security device has a first port, a second port, a third port and a fourth port. Frames to be processed may enter the first port and exit the fourth port, or may enter the fourth port and exit the first port. The first security device processes the frame, if possible, using a first set of security rules. If processing is not possible, frames entering the first port may exit through the second port, and frames entering the fourth port may exit through the third port.

The second security device has a fifth port, a sixth port, a seventh port and an eighth port. The fifth port is coupled to the second port of the first security device. The eighth port is coupled to the third port of the first security device. A frame to be processed by the second device may enter on port five and exit on port eight, or may enter on port eight and exit on port five. The second security device processes the frame, if possible, using a second set of security rules. In the preferred embodiment, the first set of security rules is more stringent than the second set of security rules. If processing is not possible, frames entering the fifth port may exit through the sixth port, and frames entering the eighth port may exit through the seventh port.

In operation, the first security device receives a frame entering through the first port or the fourth port. If the first security device is not able to process the frame using the first set of security rules, then the frame is passed to the second security device for possible processing using the second set of security rules.

The invention may be extended by adding additional security devices in a hierarchical arrangement. With such extension, a frame which cannot be processed using the first set of security rules or using the second set of security rules would be passed to a third security device for processing using a third set of security rules, and then to an $n^{th}$ security device for processing using an $n^{th}$ set of security rules, etc. Typically, the second security unit has less restrictive rules than the first, and the $n^{th}$ security unit has less restrictive rules than the second, and so on.

Figure 2:
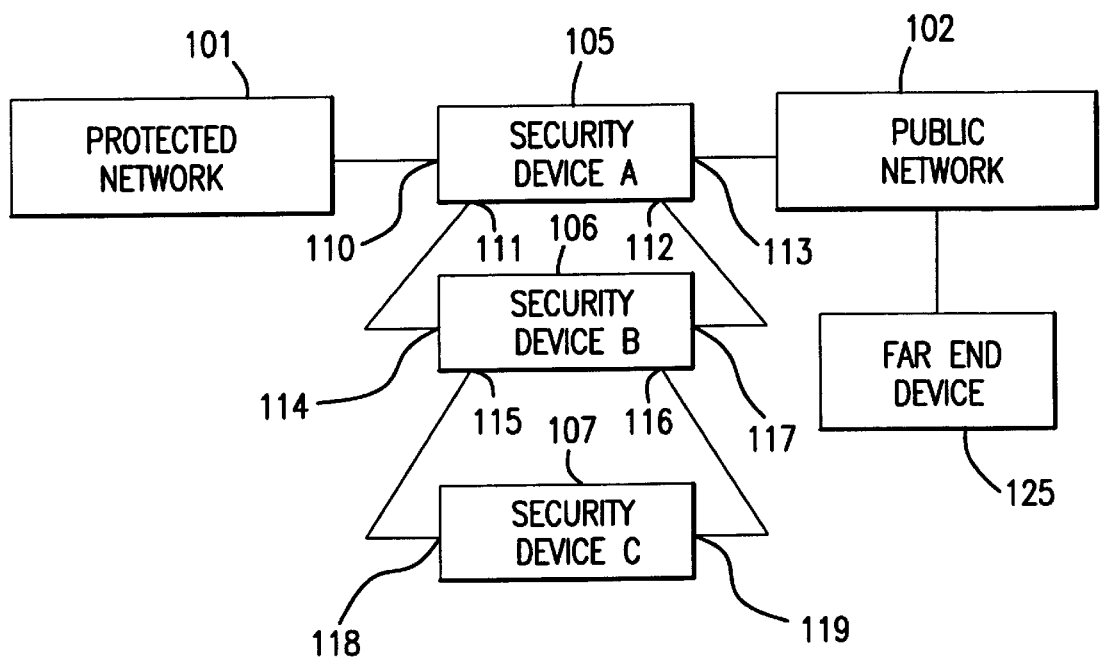
FIG. 2 illustrates the use of multiple security devices in a hierarchical arrangement in accordance with the present invention.

As illustratively shown in FIG. 2, the basic scheme of the present invention can be described as "divide and conquer." In FIG. 2, security device A 105 is the principle device between the protected network 101 and the public network 102. Security device A 105 has a first port 110, a second port 111, a third port 112, and a fourth port 113. If security device A 105 can process a particular frame entering or exiting the protected network, then it does so, with the frame entering the first port 110 or the fourth port 113 and exiting the fourth port 113 or the first port 110, respectively.

If security device A 105 cannot process the frame for some reason, such as insufficient information, then security device A 105 passes the frame to the second security device, security device B 106. Security device B has a fifth port 114, a sixth port 115, a seventh port 116, and an eighth port 117.

Frames that enter security device A 105 on the first port 110 are passed through the second port 111 to the fifth port 114 of security device B 106. Frames that enter security device A 105 on the fourth port 113 are passed through the third port 112 to the eighth port 117 of security device B 106.

If security device B 106 can process the frame, then it does so. A frame entering the fifth port 114 exits through the eighth port 117, and a frame entering the eighth port 117 exits through the fifth port 114. Frames that exit security device B 106 on the fifth port 114 enter security device A on the second port 111 and are passed to the first port 110 by security device A 105. Similarly frames that exit security device B 106 on the eighth port 117 enter security device A on the third port 112 and are passed to the fourth port 113 by security device A 105.

If security device B 106 cannot process the frame for some reason, such as insufficient information, security device B 106 passes the frame to security device C 107 in a manner similar to the manner in which security device A 105 passed frames to security device B 106. Security device C 107 has at least a ninth port 118 and a tenth port 119.

Frames that enter security device B 106 on the fifth port 114 are passed through the sixth port 115 to the ninth port 118 of security device C. Frames that enter security device B 106 on the eighth port 117 are passed through the seventh port 116 to the tenth port 119 of security device C.

In providing a firewall with the ability to automatically segregate legacy traffic from traffic supporting enhanced security features, the enhanced security features require a "security association" between the firewall and a "far end" device 125. This security association is the mechanism whereby authentication is performed, encryption keys are exchanged, and integrity information is exchanged.

Security associations are generally formed by the firewall exchanging security association setup messages with the far end device. Information relating to such security associations is maintained in a connection table. After a particular security association is established, the firewall forms an entry in its connection table. This entry tells the firewall how to process the traffic governed by the security association. For example, if the traffic is to be encrypted or decrypted, the connection table entry indicates a protocol, a range of network addresses, and the value of the encryption key. If the traffic is not to be allowed through the firewall, then the entry indicates a protocol, a range of network addresses, and instructions to discard all traffic governed by the security association.

The fact that next generation firewalls build security associations can be used to segregate the traffic. In the event that the firewall successfully builds a security association with the far end device, the firewall can apply the enhanced security features to the traffic governed by the security association. However, if the firewall is unable to build a security association (e.g., the far end device does not support the enhanced features), the firewall can build an entry in its connection table that indicates that the traffic should be passed to the legacy firewall and processed with the legacy security rules.

The firewall's configuration will dictate the firewall's action on a failed attempt to form a security association. The firewall can be configured to pass the traffic to an attached legacy firewall, or the firewall can simply pass or reject the traffic.

The present invention also includes a method for interconnecting a plurality of security devices in a distributed network to provide security between a protected network and a public network, or between two protected networks. The method comprises the steps of receiving a frame by the first security device. The first security device determines whether the first security device has sufficient information to process the frame. If the first security device determines that there is insufficient information, then the first security device passes the frame to a second security device. The second security device then determines whether the second security device has sufficient information to enable the second security device to process the frame. If the second security device determines that there is insufficient information, the second security device passes the frame to a third security device. These steps of determining the sufficiency of information and passing a frame having insufficient information to a security device lower in the hierarchy may be repeated with whatever number of security devices may be included in the plurality of security devices.

Figure 3:
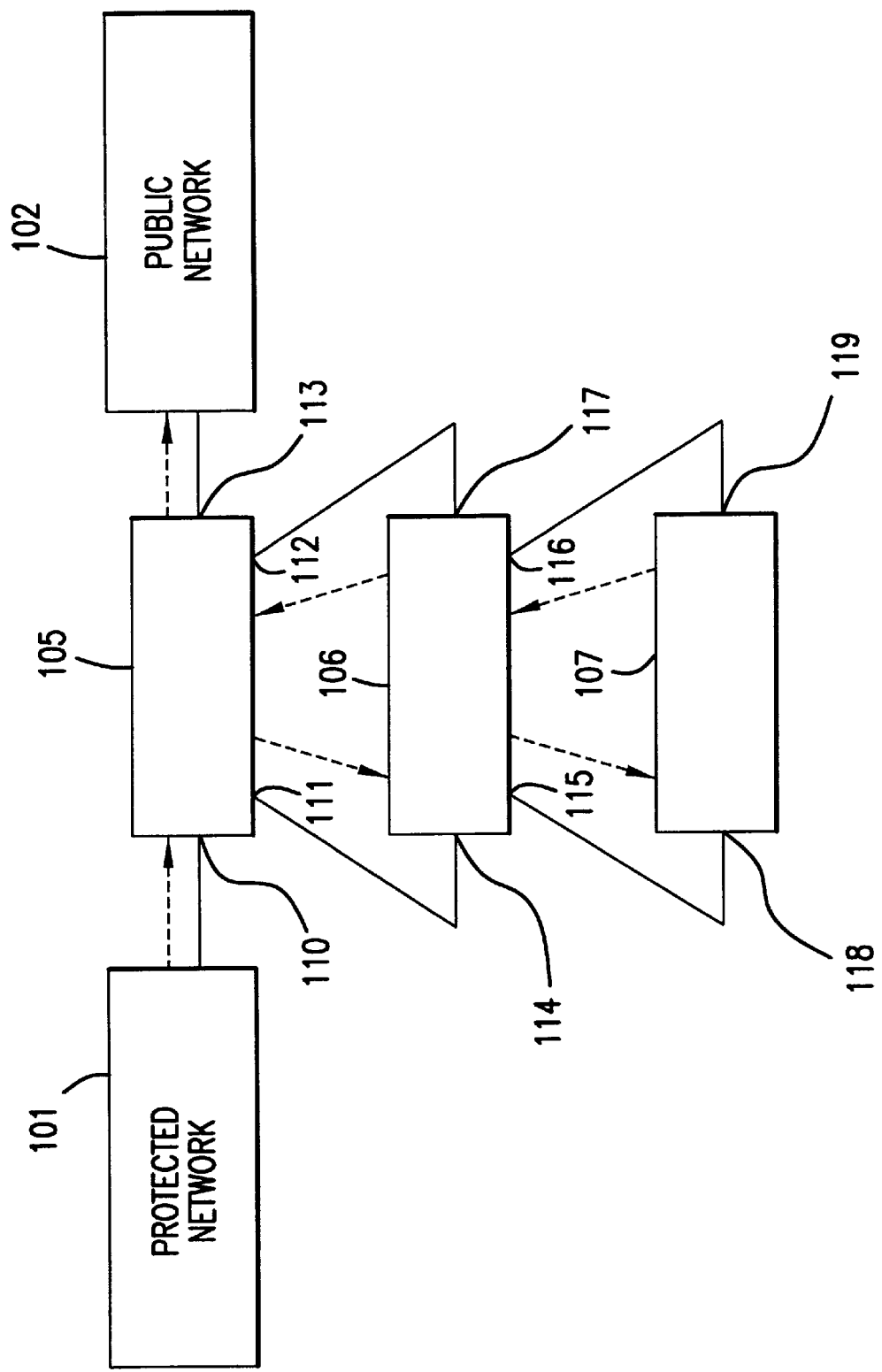
FIG. 3 illustrates data flow from a protected network to a public network using the hierarchical access capability of the present invention.

FIG. 3 illustrates the data flow from a protected network 101 to a public network 102 using the method of the present invention. The first security device 105 receives, through the first port 110, a frame from the protected network 101. The first security device 105 then determines whether there is sufficient information in the frame to enable the first security unit to process the frame. If there is sufficient information in the frame, then the first security device processes the frame using the first security device's set of security rules. Following processing, the frame is passed through the fourth port 113 to the public network 102. If insufficient information is present in the frame, then the first security device passes the frame through the second port 111 to the second security unit 106.

The second security device 106 receives the frame through the fifth port 114. The second security device 106 then determines whether the second security device has sufficient information to enable the second security device to process the frame. If there is sufficient information in the frame, then the second security device 106 processes the frame using the second security device's set of security rules. Following processing, the frame is passed through the eighth port 117 to the third port 112 of the first security device. The first security device passes the frame through the fourth port 113 to the public network 102. If there is insufficient information, then the second security device passes the frame through the sixth port 115 to a third security device 107.

The third security device receives the frame through a ninth port 118. The third security device 107 then determines whether the third security device has sufficient information in the frame to enable the third security device to process the frame. If there is sufficient information in the frame, then the third security device processes the frame using the third security device's set of security rules.

Following processing by the third security device, the frame is passed through the tenth port 119 from the third security device 107 to the seventh port 116 of the second security device 106. The second security device 106 passes the frame through the eighth port 117 to the third port 112 of the first security device 105. The frame is then passed through the fourth port 113 to the public network 102. Any number of security devices may be added to this chain of security devices as dictated by particular system application and user requirements. If processing by an earlier device is not possible, the last security device in the chain will process the frame to the extent possible. Thus, if the third security device is the last security device in the chain, then the third security device will process the frame to whatever extent is possible given the available information.

Figure 4:
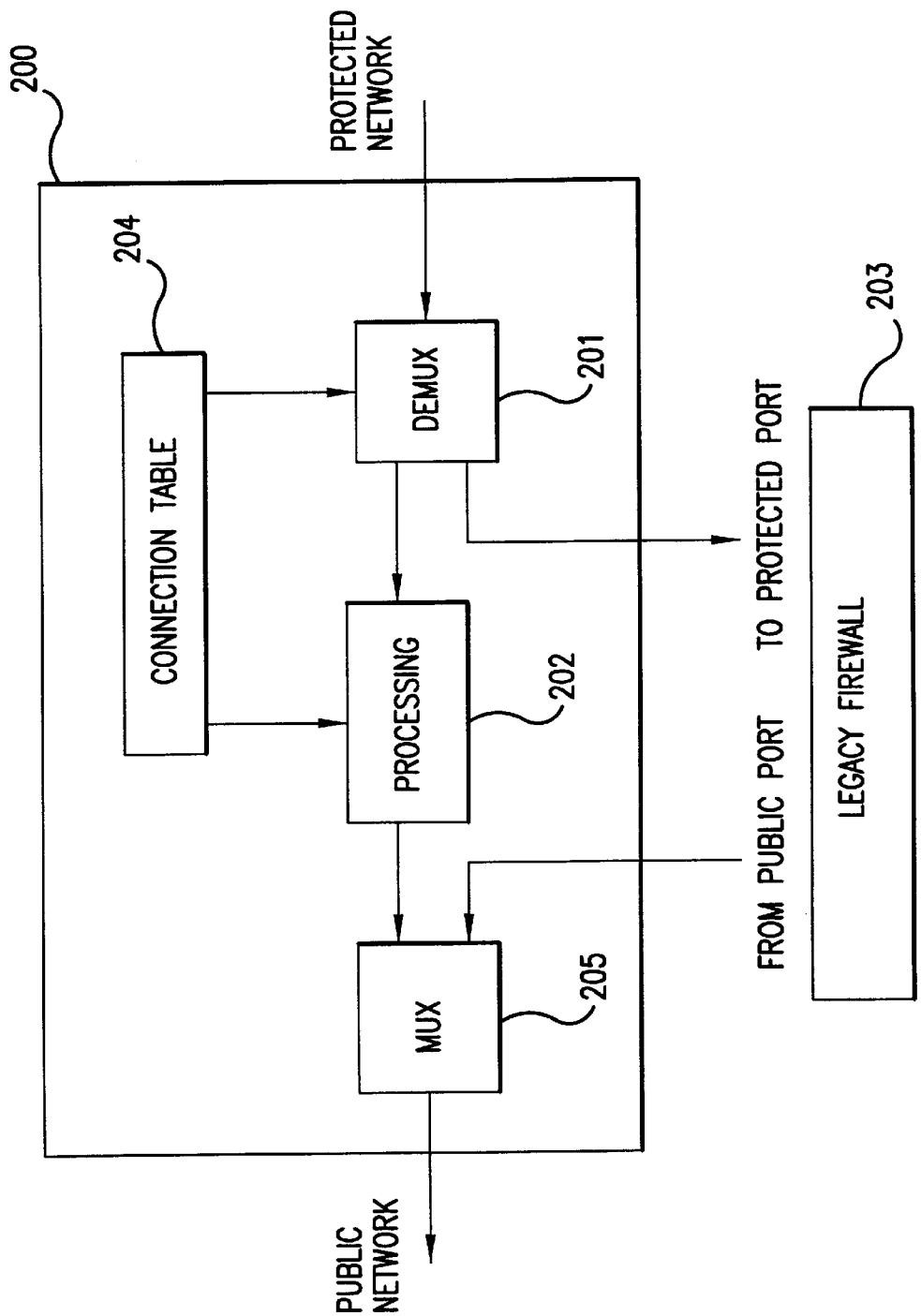
FIG. 4 illustrates data flow from a protected network to a public network showing the relationship between the enhanced firewall and the legacy firewall.

Data flow from a protected network to a public network, showing the relationship between the enhanced firewall and the legacy firewall, is illustrated in FIG. 4. The frame arrives at the enhanced firewall 200 from the protected network and is presented to a demultiplexer 201. The demultiplexer is controlled by the connection table. The demultiplexer 201 passes the traffic to the processing unit 202 or to the legacy firewall 203, depending on the entry for that traffic in the connection table 204. If the relevant entry in the connection table 204 indicates that the traffic should be processed by the enhanced firewall 200, the traffic is passed to the processing unit 202 within the enhanced firewall 200. If the entry in the connection table 204 indicates that the traffic should be processed by the legacy firewall 203, the traffic is passed out of the enhanced firewall 200 to the protected port of the legacy firewall 203. The protected port is the port normally connected to the protected network. The output of the processing unit and the output of the legacy firewall, passing through the public port, are combined in the multiplexer 205 and passed to the public network.

Figure 5:
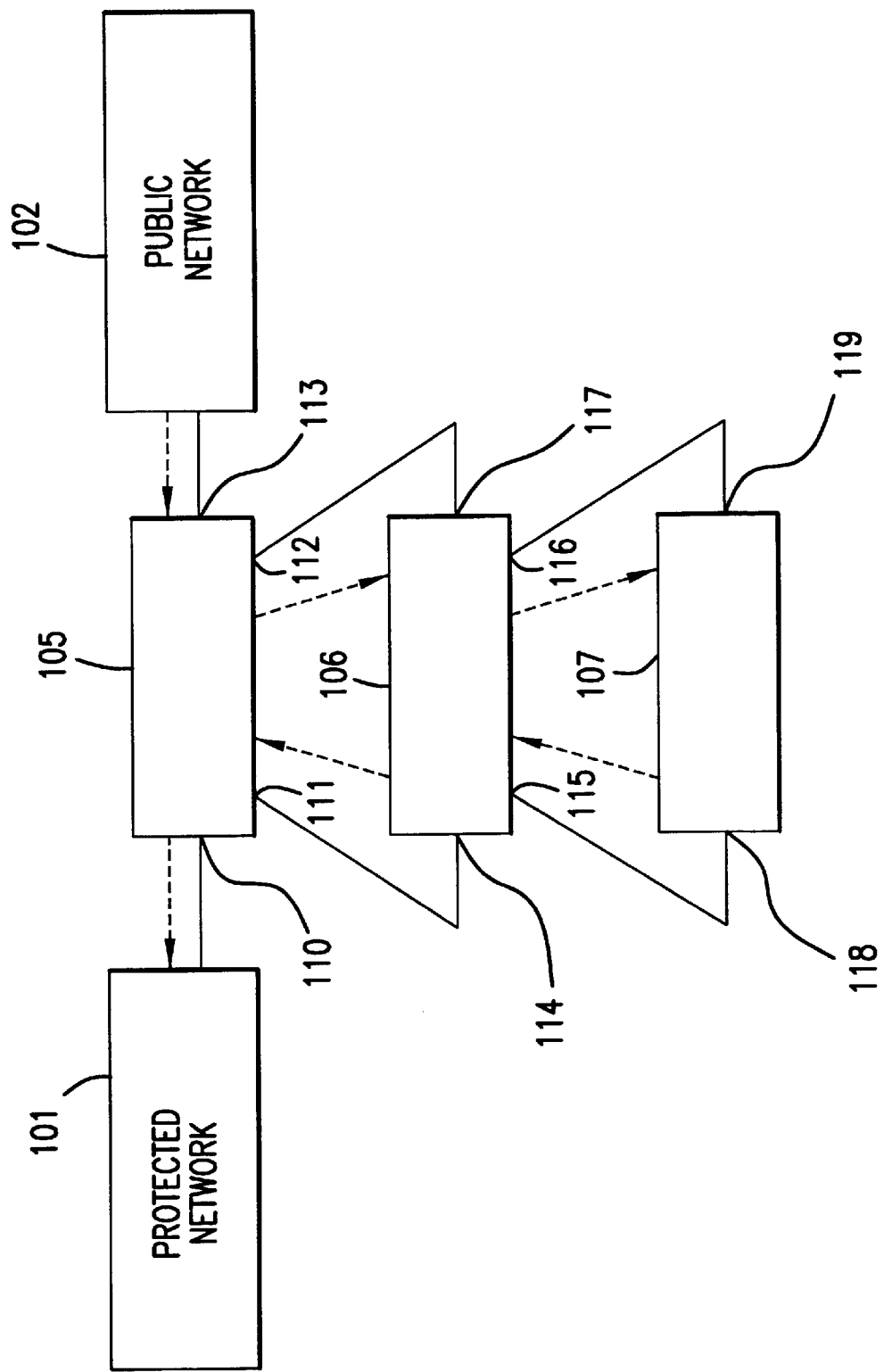
FIG. 5 illustrates data flow from a public network to a protected network using the hierarchical access capability of the present invention.

FIG. 5 shows the data flow from a public network 102 to a protected network 101. In this embodiment, the first security device 105 receives, through the fourth port 113, a frame from the public network 102. The first security device 105 then determines whether the first security device has sufficient information to enable the first security device to process the frame. If there is sufficient information in the frame, then the first security device processes the frame using the first security device's set of security rules. Following processing, the frame is passed through the first port 110 to the protected network 101. If there is insufficient information, then the first security device passes the frame through the third port 112 to the second security device 106.

The second security device 106 receives the frame through the eighth port 117. The second security device then determines whether the second security device has sufficient information in the frame to enable the second security device to process the frame. If there is sufficient information in the frame, then the second security device 106 processes the frame using the second security device's set of security rules. Following processing, the frame is passed through the fifth port 114 to the second port 111 of the first security device. The first security device passes the frame through the first port 110 to the public network 102. If there is insufficient information, then the second security device passes the first frame through the seventh port 116 to a third security device 107.

The third security device 107 receives the frame through the tenth port 119. The third security device then determines whether the third security device has sufficient information in the frame to enable the third security device to process the frame. If there is sufficient information, the third security device processes the first frame.

Following processing, the frame is passed through the ninth port 118 from the third security device 107 to the sixth port 115 of the second security device 106. The frame is then passed through the fifth port 114 to the second port 111 of first security device 105, and is then passed through the first port 110 to the protected network 101. Any number of security devices may be added to this chain of security devices as dictated by particular system application and user requirements. If processing by an earlier device is not possible, the last security device in the chain will process the frame to the extent possible. Thus, if the third security device is the last security device in the chain, then the third security device will process the frame to whatever extent is possible given the available information.

Figure 6:
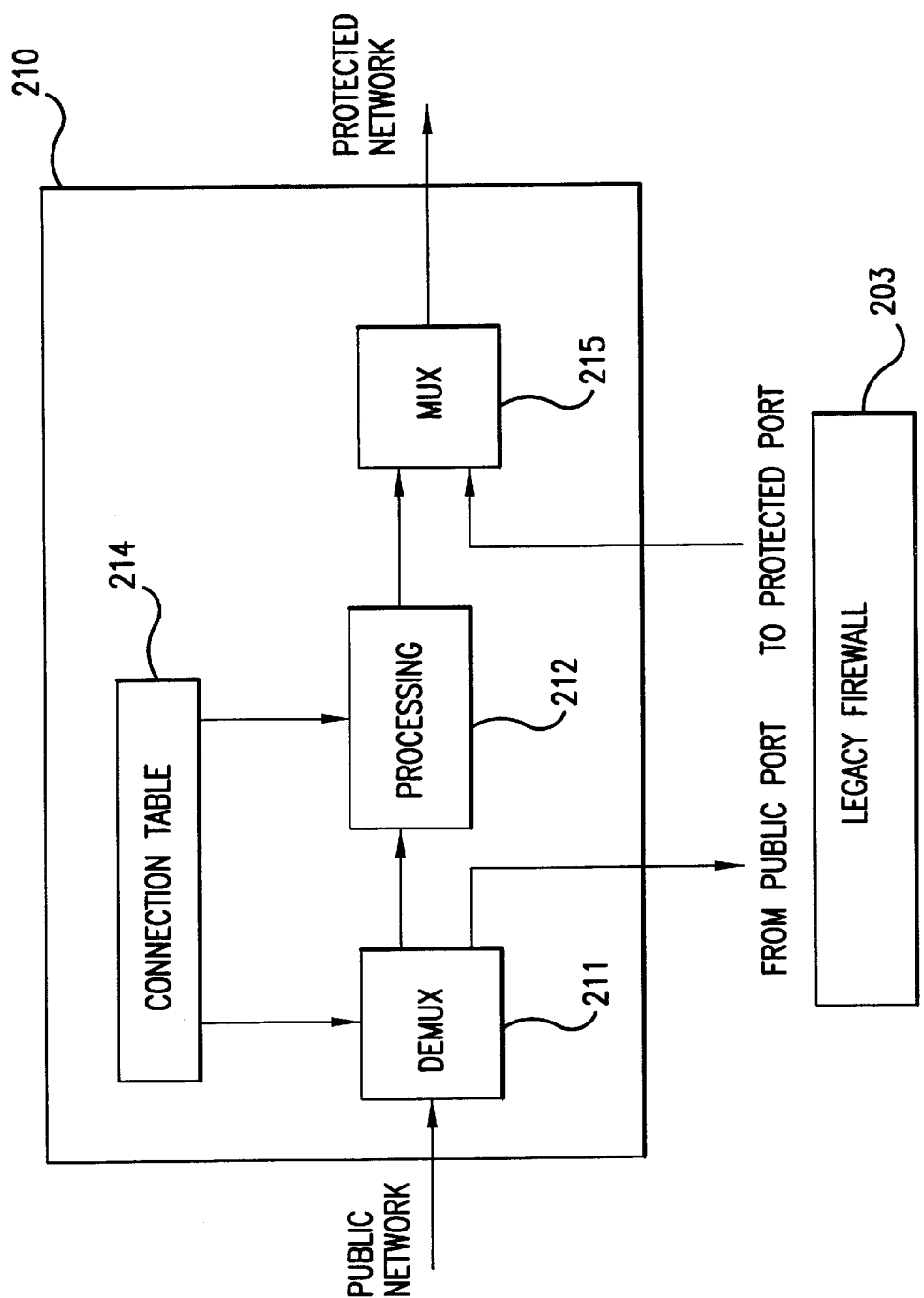
FIG. 6 illustrates data flow from a public network to a protected network showing the relationship between the enhanced firewall and the legacy firewall.

FIG. 6 shows the data flow from the public network to the protected network, including the relationship between the enhanced firewall 210 and the legacy firewall 203. The traffic enters a demultiplexer 211, which is controlled by the connection table 214. If the relevant entry in the connection table 214 indicates that the traffic should be processed by the enhanced firewall 210, the traffic is passed to the processing unit 212 within the enhanced firewall 210. If the entry in the connection table 214 indicates that the traffic should be processed by the legacy firewall 203, the traffic is passed out of the enhanced firewall 210 to the public port of the legacy firewall 203. The public port is the port normally connected to the public network. The output of the processing unit and the output of the legacy firewall, passing through the protected port, are combined in the multiplexer 215 and passed to the protected network.

Figure 7:
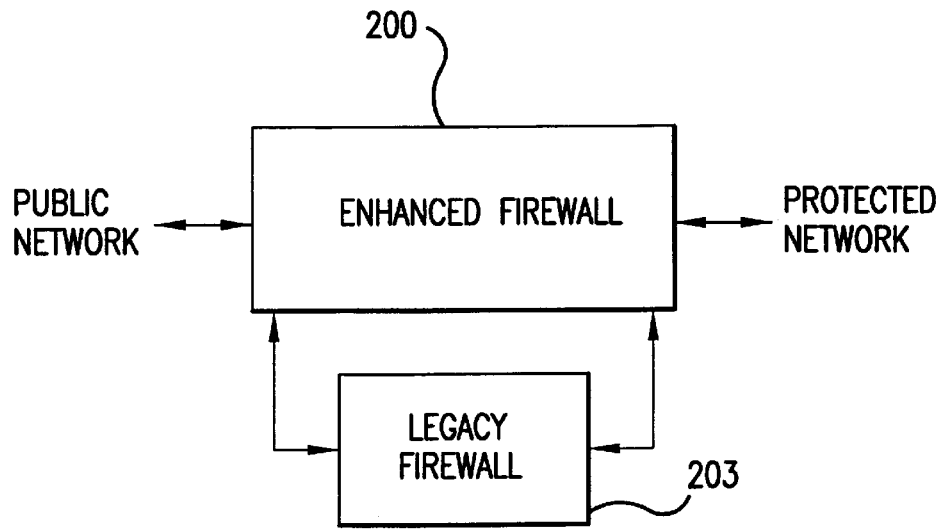
FIG. 7 illustrates the overall system.

The overall system, illustrated in FIG. 7, shows the interconnection between the enhanced firewall 200 and the legacy firewall 203. As shown in FIG. 7, the enhanced firewall 200 is a four port device: one port connects the enhanced firewall to the public network, a second port connects the enhanced firewall to the protected network, and two ports connect the enhanced firewall to the legacy firewall 203.

Figure 8:
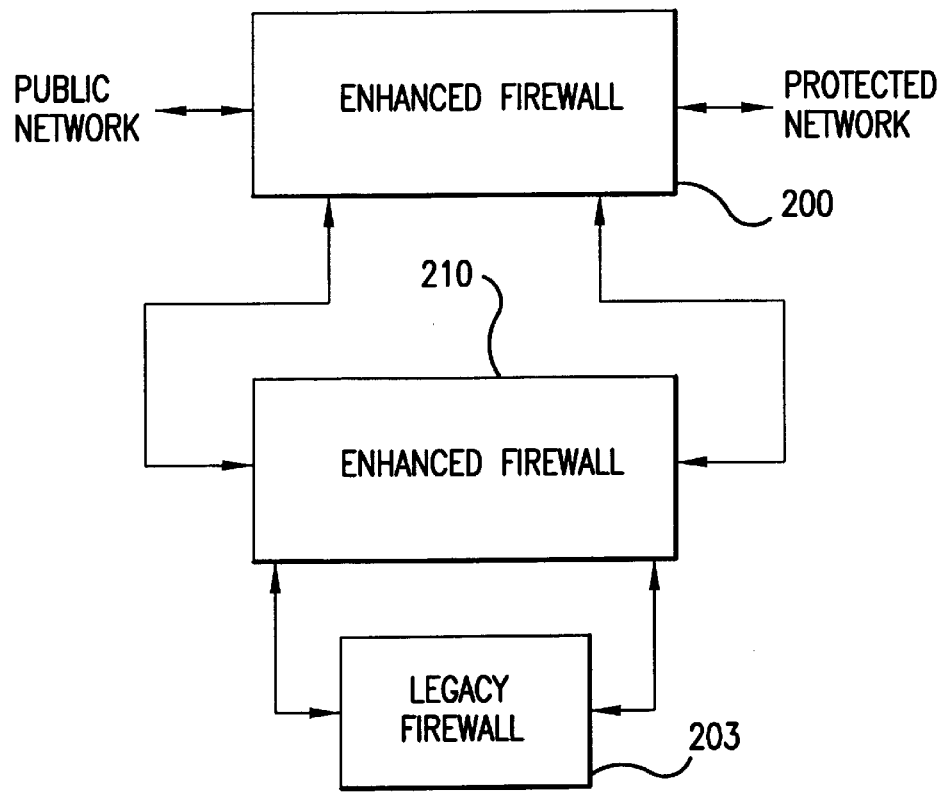
FIG. 8 illustrates the overall system with two enhanced firewalls.

As shown in FIG. 8, it is possible to interconnect multiple enhanced firewalls. In this example, two enhanced firewalls 200, 210 and one legacy firewall 203 are interconnected. The first enhanced firewall 200, located at the top, is the "master" in the sense that if the first enhanced firewall 200 can build a security association for the traffic, the first enhanced firewall 200 will process the traffic. If the first enhanced firewall cannot build a security association for the traffic, the first firewall 200 can pass the traffic to the second enhanced firewall 210, located in the middle. The second enhanced firewall 210 will process the traffic if the second enhanced firewall can build a security association. If the second enhanced firewall cannot process the traffic, the second enhanced firewall can pass the traffic to the legacy firewall 203, located at the bottom. No matter which firewall processes the traffic, the traffic is passed back to the first enhanced firewall 200, at the top, to be forwarded to either the public or protected network.

The hierarchy of security devices as taught by the present invention may be used with a transitional purpose to upgrade a system having lower security requirements to a system having heightened security requirements. Because the system of the present invention has a passing-off capability, the system may be incorporated into and work with an existing system. The first security device may employ certificate-based strong method authentication and encryption techniques. This first security device processes incoming frames if possible. If processing is not possible, then the first security device can shunt the frame to a second security device having reduced security requirements. This second security device may represent the existing security access device relied upon prior to incorporation of the first security device. This shunting to an existing security device having reduced security requirements enables heightened security to be introduced gradually in a cost effective manner. The existing system may be allowed to continue to operate, recognizing password or user identification entry requirements, for example, while a bridge is built to an upgraded security system which will eventually replace the existing system.

The hierarchical arrangement of security devices as taught by the present invention may also be implemented in an alternative embodiment to provide multi-level security within a protected network. In the alternative embodiment, there is no shunting to security devices having less stringent access requirements unless the security policy allows access through such lessened security access requirements.

For multi-level security, services within the protected network may require varying levels of access authorization. Some services may be accessible with the input of a user's name or token only. Other services may require encryption and certificate-based authentication. Using the hierarchical arrangement of security devices as taught herein, such multi-level security requirements may be easily accommodated.

Figure 9:
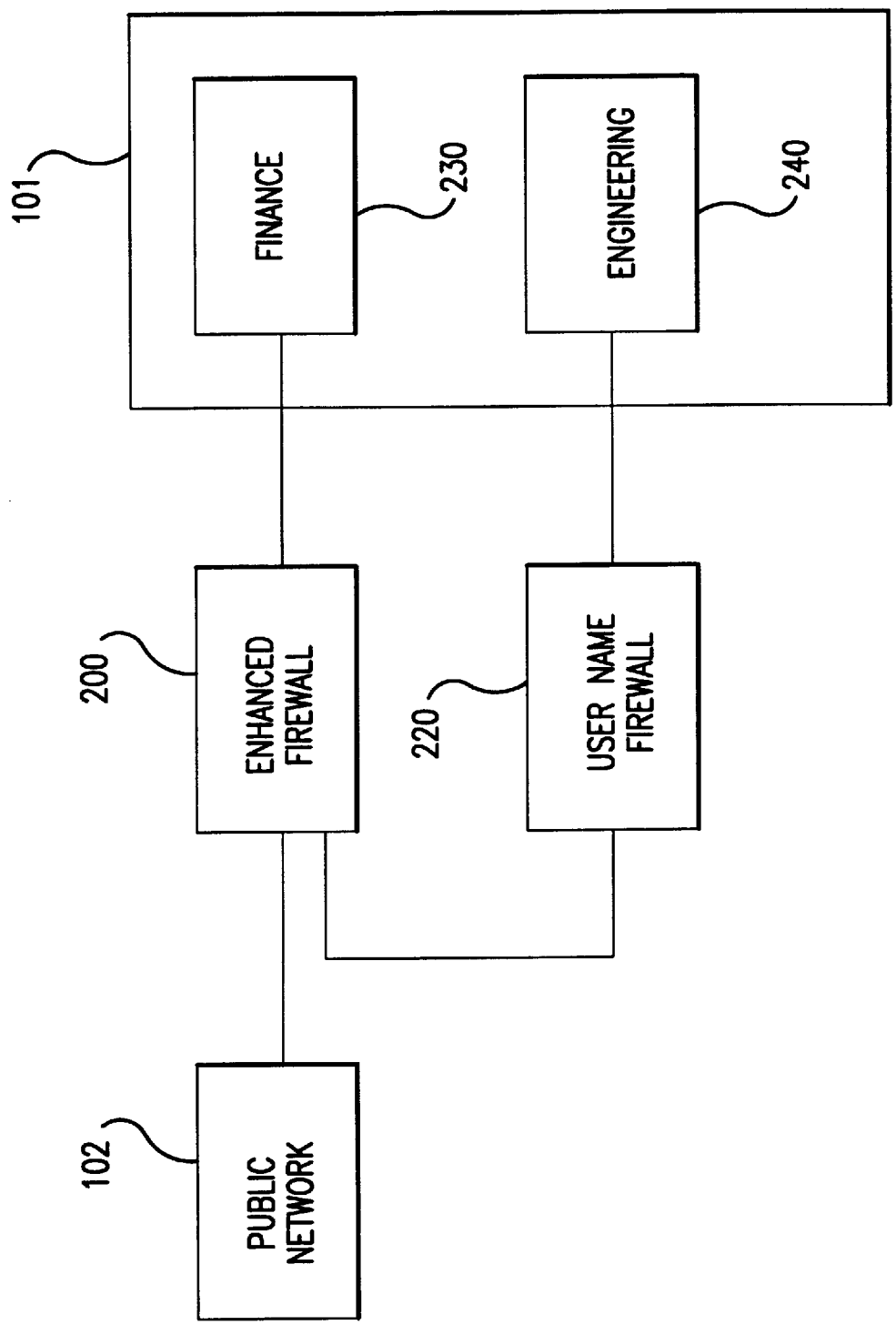
FIG. 9 illustrates an example of sub-networks within a protected network.

As an example of the alternative embodiment, illustrated in FIG. 9, the system of the present invention may comprise a first security device 200 having a first set of access requirements that use certificate-based strong method authentication and encryption, and a second security device 220 having a second set of access requirements that use user name identification. The first security device 200 is coupled between a public network 102 and a protected network 101. The second security device is coupled to the first security device.

The protected network may be divided into a plurality of sub-networks. For the purposes of this example, assume the sub-networks include finance 230 and engineering 240. The finance sub-network 230 can be set up to require authorization through the first security device 200 at the certificate-based level before access is permitted. The engineering sub-network 240 can be set up to require only user name identification through the second security device 220.

A user cleared at the certificate-based level may access the finance sub-network 230 after being processed by the first security device 200. A user cleared only at the user name identification level, however, would not be permitted to access the finance sub-network 230, even though this user could proceed through the security devices to be processed by the second security device 220 and gain access to the engineering sub-network 240 only.

It will be apparent to those skilled in the art that various modifications can be made to the hierarchical arrangement of security devices of the instant invention without departing from the scope or spirit of the invention, and it is intended that the present invention cover modifications and variations of the hierarchical arrangement of security devices provided they come within the scope of the appended claims and their equivalents.

I claim:

1. A system for securing a communications channel between a protected network and a public network using a hierarchical arrangement of security devices, comprising:

a first security device, coupled between said protected network and said public network on the communications channel, said first security device having a first port coupled to said protected network, a second port, a third port and a fourth port coupled to said public network, said first security device for processing a frame using a first set of security rules; and a second security device, coupled in parallel to said first security device, said second security device having a fifth port, a sixth port, a seventh port and an eighth port, the fifth port coupled to the second port of said first security device, and the eighth port coupled to the third port of said first security device, said second security device, responsive to the first security device not processing the frame and passing the frame through the fifth port from said first security device to said second security device, for processing the frame using a second set of security rules.

2. The system as set forth in claim 1, further comprising a third security device, coupled in Parallel to said second security device, said third security device having a ninth port and a tenth port, the ninth port coupled to the sixth port of said second security device, and the tenth port coupled to the seventh port of said second security device, said third security device, responsive to the second security device not processing the frame and passing the frame from said second security device to said third security device, for processing the frame using a third set of security rules.

3. The system as set forth in claim 2, with the first set of security rules including certificate-based authentication for identity and access control, the second set of security rules including password authentication, and the third set of security rules including frame addressing identification.

4. The system as set forth in claim 1, with said first security device including an encryption processor.

5. The system as set forth in claim 1, with said second security device including a password processor.

6. A method for interconnecting a plurality of security devices in a distributed network to provide a level of security between a protected network and a public network, the method comprising the steps of:

receiving, by a first security device, a frame;

determining, with a first set of security rules by the first security device, sufficiency of information for processing the frame;

passing, responsive to a determination of insufficient information, the frame to a second security device connected in parallel to said first security device;

determining, with a second set of security rules by the second security device, sufficiency of information for processing the frame;

passing, responsive to a determination of insufficient information, the frame to an $n^{th}$ security device connected in parallel to said first security device;

determining, with an $n^{th}$ set of security rules by the $n^{th}$ security device, sufficiency of information for processing the frame; and processing, by the $n^{th}$ security device, responsive to a determination of sufficient information, the frame.

7. The method as set forth in claim 6, with the step of processing including the step of allowing the frame to access the protected network.

8. The method as set forth in claim 7, with the step of allowing including the step of limiting the frame to specified portions of the protected network.

9. A method for interconnecting a plurality of security devices in a distributed network to insulate a protected network from a public network, the plurality of security devices including a first security device having a first port, a second port, a third port, and a fourth port, and a second security device having a fifth port, a sixth port, a seventh port and an eighth port, the method comprising the steps of:

receiving, by the first security device through the first port, a first frame from the protected network;

determining, by the first security device, sufficiency of information for processing the first frame;

passing, responsive to a determination of insufficient information, the first frame to the second security device through the second port;

receiving, by the second security unit through the fifth port, the first frame;

determining, by the second security device, sufficiency of information for processing;

processing, by the second security device, responsive to sufficient information, the first frame;

passing, through the eighth port, the first frame from the second security device to the third port of the first security device; and passing, through the fourth port, the first frame from the first security device to the public network.

10. The method as set forth in claim 9, further comprising the steps of:

receiving, by the first security device through the fourth port, a second frame from the public network;

determining, by the first security device, sufficiency of information for processing;

passing, responsive to a determination of insufficient information, the second frame to the second security device through the third port;

receiving, by the second security device through the eighth port, the second frame;

determining, by the second security device, sufficiency of information for processing;

processing, by the second security device, responsive to sufficient information, the second frame;

passing, through the fifth port, the second frame from the second security device to the second port of the first security device; and passing, through the first port, the second frame from the first security device to the protected network.

11. A method for interconnecting a plurality of security devices in a distributed network to insulate a protected network from a public network, the plurality of security devices including a first security device having a first port, a second port, a third port and a fourth port, a second security device having a fifth port, a sixth port, a seventh port and an eighth port, and an $n^{th}$ security device having a ninth port and a tenth port, the method comprising the steps of:

receiving, by the first security device through the first port, a first frame from the protected network;

determining, by the first security device, sufficiency of information for processing;

passing, responsive to a determination of insufficient information, the first frame through the second port to the second security device;

receiving, by the second security device through the fifth port, the first frame;

determining, by the second security device, sufficiency of information for processing;

passing, responsive to a determination of insufficient information, the first frame through the sixth port to the $n^{th}$ security device;

receiving, by the $n^{th}$ security device through the ninth port, the first frame;

determining, by the $n^{th}$ security device, sufficiency of information for processing;

processing, by the $n^{th}$ security device, responsive to a determination of sufficient information, the first frame;

passing, through the tenth port, the first frame from the $n^{th}$ security device to the seventh port of the second security device;

passing, through the eighth port, the first frame to the third port of the first security device; and passing, through the fourth port, the first frame to the public network.

12. A method for interconnecting a plurality of security devices in a distributed network to insulate a protected network from a public network, the plurality of security devices including a first security device having a first port, a second port, a third port and a fourth port, a second security device having a fifth port, a sixth port, a seventh port and an eighth port, and an $n^{th}$ security device having a ninth port and a tenth port, the method comprising the steps of:

receiving, by the first security device through the fourth port, a first frame from the public network;

determining, by the first security device, sufficiency of information for processing;

passing, responsive to a determination of insufficient information, the first frame through the third port to the second security device;

receiving, by the second security device through the eighth port, the first frame;

determining, by the second security device, sufficiency of information for processing;

passing, responsive to a determination of insufficient information, the first frame through the seventh port to the $n^{th}$ security device;

receiving, by the $n^{th}$ security device through the tenth port, the first frame;

determining, by the $n^{th}$ security device, sufficiency of information for processing;

processing, by the $n^{th}$ security device, responsive to a determination of sufficient information, the first frame;

passing, through the ninth port, the first frame from the $n^{th}$ security device to the sixth port of the second security device;

passing, through the fifth port, the first frame to the second port of the first security device; and passing, through the first port, the first frame to the protected network.

13. The method as set forth in claim 12, further comprising the steps of:

receiving, by the first security device through the fourth port, a second frame from the public network;

determining, by the first security device, sufficiency of information for processing;

processing, responsive to a determination of sufficient information, the second frame;

passing, through the first port, the second frame to the protected network.

14. The method as set forth in claim 12, further comprising the steps of:

receiving, by the first security device through the fourth port, a second frame from the public network;

determining, by the first security device, sufficiency of information for processing;

passing, responsive to a determination of insufficient information, the second frame through the third port to the second security device;

receiving, by the second security device through the eighth port, the second frame;

determining, by the second security device, sufficiency of information for processing;

processing, responsive to a determination of sufficient information, the second frame;

passing, through the fifth port, the second frame from the second security device to the second port of the first security device; and passing, through the first port, the second frame to the protected network.

15. A system for securing a communications channel between a protected network and a public network using a hierarchical arrangement of security devices, comprising:

a first security device, coupled between said protected network and said public network, and responsive to a frame having sufficient information, for processing the frame using a first set of security rules; and a second security device, coupled in parallel to said first security device, responsive to receiving the frame having insufficient in formation for processing the frame with the first set of security rules from said first security device, for processing the frame using a second set of security rules, with the second set of security rules independent from the first set of security rules.

16. The system as set forth in claim 15, further comprising a third security device, coupled in parallel to said second security device, said third security device, responsive to receiving the frame having insufficient information for processing using the second set of security rules from said second security device, for processing the frame using a third set of security rules.

17. The system as set forth in claim 15, with the first set of security rules including certificate-based authentication for identity and access control, the second set of security rules including password authentication, and a third set of security rules including frame addressing identification.

18. The system as set forth in claim 15, with said first security device including an encryption processor.

19. The system as set forth in claim 15, with said second security device including a password processor.

20. A method using a plurality of interconnected security devices in a distributed network to provide a level of security between a protected network and a public network, the method comprising the steps of:

receiving, by a first security device, a frame;

processing, responsive to determining sufficient information, using a first set of security rules by the first security device, the frame;

passing, responsive to a determination of insufficient information for processing the frame by the first security device, the frame to a second security device connected in parallel with said first security device; and processing, using a second set of security rules by the second security device, sufficiency of information of the frame.

21. The method as set forth in claim 20, further including the steps of:

passing, responsive to a determination of insufficient information for processing the frame by the second security device, the frame to a third security device connected in parallel with said first security device; and processing, using a third set of security rules by the third security device, sufficiency of information for processing the frame.

22. The method as set forth in claim 20, with the second step of processing including a step of allowing the frame to access the protected network.

23. The method as set forth in claim 22, with the step of allowing including the step of limiting the frame to specified portions of the protected network.

24. The method as set forth in claim 21, with the third step of processing including a step of allowing the frame to access the protected network.

25. The method as set forth in claim 24, with the step of allowing including the step of limiting the frame to specified portions of the protected network.

26. A system using a plurality of interconnected security devices in a distributed network to provide a level of security between a protected network and a public network, comprising:

a first security device for receiving a frame, for determining, with a first set of security rules, any of sufficiency and insufficiency, of information for processing the frame; and a second security device, connected in parallel with said first security device, responsive to the first security device determining insufficiency of information for processing the frame, for determining, with a second set of security rules, sufficiency of information for processing the frame.

27. The system as set forth in claim 26, further comprising a third security device, coupled in parallel to said second security device, responsive to the second security device determining insufficiency of information for processing the frame, for determining, with a third set of security rules, sufficiency of information for processing the frame.

28. The system as set forth in claim 26, with the first set of security rules including certificate-based authentication for identity and access control, the second set of security rules including password authentication, and a third set of security rules including frame addressing identification.

29. The system as set forth in claim 26, with said first security device including an encryption processor.

30. The system as set forth in claim 26, with said second security device including a password processor.

* * * * *